(12) United States Patent
Kuiper et al.

(10) Patent No.: US 7,245,439 B2
(45) Date of Patent: Jul. 17, 2007

(54) VARIABLE LENS

(75) Inventors: Stein Kuiper, Eindhoven (NL); Bokke Johannes Feenstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/564,387

(22) PCT Filed: Jul. 7, 2004

(86) PCT No.: PCT/IB2004/051154

§ 371 (c)(1),
(2), (4) Date: Jan. 12, 2006

(87) PCT Pub. No.: WO2005/006029

PCT Pub. Date: Jan. 20, 2005

(65) Prior Publication Data

US 2006/0279848 A1   Dec. 14, 2006

(30) Foreign Application Priority Data

Jul. 14, 2003   (EP) ................................. 03102138

(51) Int. Cl.
*G02B 1/06* (2006.01)
*G02B 3/08* (2006.01)
(52) U.S. Cl. ...................... 359/665; 359/742
(58) Field of Classification Search ............ 359/665, 359/742
See application file for complete search history.

(56) References Cited

U.S. PATENT DOCUMENTS

| 6,288,846 B1 | 9/2001 | Stoner, Jr. |
| 6,445,509 B1 | 9/2002 | Alden |
| 6,891,682 B2 * | 5/2005 | Aizenberg et al. .......... 359/738 |

FOREIGN PATENT DOCUMENTS

| EP | 0 560 664 A1 | 9/1993 |
| WO | WO 09/27448 | 6/1998 |
| WO | WO 01/22148 A1 | 3/2001 |

OTHER PUBLICATIONS

JP 10048597—"Optical Device" Inventor; Suyama Shiro.
"Variable Power Fresnel Lens and its Manufacture" JP; 3-6501(A); Jan. 14, 1991.
Patent Abstracts of Japan, 10026705 A. Jan. 17, 1998.

* cited by examiner

*Primary Examiner*—David Spector
*Assistant Examiner*—William Choi
(74) *Attorney, Agent, or Firm*—Michael E. Belk

(57) ABSTRACT

A variable lens having an optical axis is described. The lens comprises a plurality of annuli located around the optical axis. Each annulus has respective side walls defining a chamber containing a first fluid and a second fluid in contact over a meniscus. The fluids are substantially immiscible and have different refractive indices. At least one of the annuli comprises at least one electrode for altering the configuration of the meniscus.

17 Claims, 7 Drawing Sheets ial patent application WO 99/18456 describes a

VARIABLE LENS

FIELD OF THE INVENTION

The present invention relates to a variable lens, to optical devices including such a lens, and to methods of manufacturing such lenses and such devices.

BACKGROUND OF THE INVENTION

A lens is a device that can change the vergence (converge or diverge) of light of one or more wavelengths. The term light is understood to include both visible electromagnetic radiation, and other wavelengths of electromagnetic radiation.

A variable (or adjustable) lens is a lens in which one or more properties of the lens can be controllably adjusted e.g. in which either the focal length or the position of the lens can be altered.

Variable focus lenses based on electrowetting devices are known. Electrowetting devices are devices that utilize the electrowetting phenomenon to operate. In electrowetting, the three-phase contact angle between two fluids and a solid is changed with applied voltage.

International patent application WO 99/18456 describes a variable focus lens utilizing the electrowetting effect. FIG. 1 is a cross-sectional view of such a typical optical device. The device has two immiscible fluids 80, 87 confined in a sealed space 92 (i.e. a chamber or cavity). The term immiscible indicates that the two fluids do not mix. The first fluid 80 is an insulator (e.g. silicone oil) and the second fluid 87 electro conductive (e.g. a mixture of water and ethyl alcohol). The first fluid 80 and the second fluid 87 have different refractive indices.

A voltage from a voltage supply 50 can be applied to the two electrodes 51, 52 so as to produce an electric field between the first fluid 87 and the electrode 52 (an insulating layer 65 prevents the second electrode 52 contacting the conductive second fluid).

By varying the voltage applied to the second fluid 87, the shape of an interface 85 between the first fluid 80 and the second fluid 87 is altered, so as to change the lens function provided by the interface 85. The device has a water-repellent film 60 of diameter D1 on the insulating layer 65 surrounded by a ring of a hydrophilic agent 70 so as to locate the first fluid 80.

Fluid based lenses having a size of the order of centimetres or larger are sensitive to gravity, movement and vibrations. Whilst this problem can to some extent be overcome by using high-viscosity fluids, this results in a decrease in the lens response time (i.e. the time the lens takes to change so as to provide a different lens functions).

Furthermore, fluid lenses with a large diameter generally also have a large thickness, and thus take up a relatively large volume. This can make the lens bulky, slow in response and unsuitable for applications where space is at a premium.

It is an aim of embodiments of the present invention to provide a variable lens that addresses one or more problems of the prior art, whether referred to herein or otherwise. It is also an aim of the present invention to provide optical devices incorporating such lenses, and methods of manufacturing such lens and such devices.

It is an aim of particular embodiments of the present invention to provide a relatively large diameter variable lens that is relatively insensitive to movement and vibrations, whilst still having a relatively rapid response time. It is an aim of particular embodiments of the present invention to provide a large diameter variable lens that is relatively thin.

STATEMENTS OF THE INVENTION

In a first aspect, the present invention provides a variable lens having an optical axis, the lens comprising a plurality of annuli located around the optical axis, each annulus having respective side walls defining a chamber containing a first fluid and a second fluid in contact over a meniscus, the fluids being substantially immiscible and having different refractive indices; and wherein at least one of the annuli comprises at least one electrode for altering the configuration of the meniscus.

By providing such annuli or rings, the overall function provided by the lens is the sum of the individual optical functions provided by the menisci of each annulus. The lens operates as a Fresnel lens, where the annuli form the zones of the Fresnel lens. The thickness of each ring will be smaller than the radius of the overall lens. The response time of each individual meniscus (and thus the overall lens) will thus be faster than the response time of an equivalent lens formed having a single meniscus.

In another aspect, the present invention provides a device comprising a variable lens, the variable lens having an optical axis, the lens comprising a plurality of annuli located around the optical axis, each annulus having respective side walls defining a chamber containing a first fluid and a second fluid in contact over a meniscus, the fluids being substantially immiscible and having different refractive indices; and wherein at least one of the annuli comprises at least one electrode for altering the configuration of the meniscus.

In a further aspect, the present invention provides a method of manufacturing a variable lens having an optical axis, the method comprising: providing a plurality of annuli located around an optical axis, each annulus having respective side walls defining a chamber; filling the chamber with a first fluid and a second fluid in contact over a meniscus, the fluids being substantially immiscible and having different refractive indices; and providing at least one of the annuli with at least one electrode for altering the configuration of the meniscus.

In another aspect, the present invention provides a method of manufacturing a device comprising a variable lens, the method comprising: providing a plurality of annuli located around the optical axis, each annulus having respective side walls defining a chamber containing a first fluid and a second fluid in contact over a meniscus, the fluids being substantially immiscible and having different refractive indices; and wherein at least one of the annuli comprises at least one electrode for altering the configuration of the meniscus.

BRIEF DESCRIPTION OF DRAWINGS

For a better understanding of the invention, and to show how embodiments of the same may be carried into effect, reference will now be made, by way of example, to the accompanying diagrammatic drawings in which.

Figure 4:
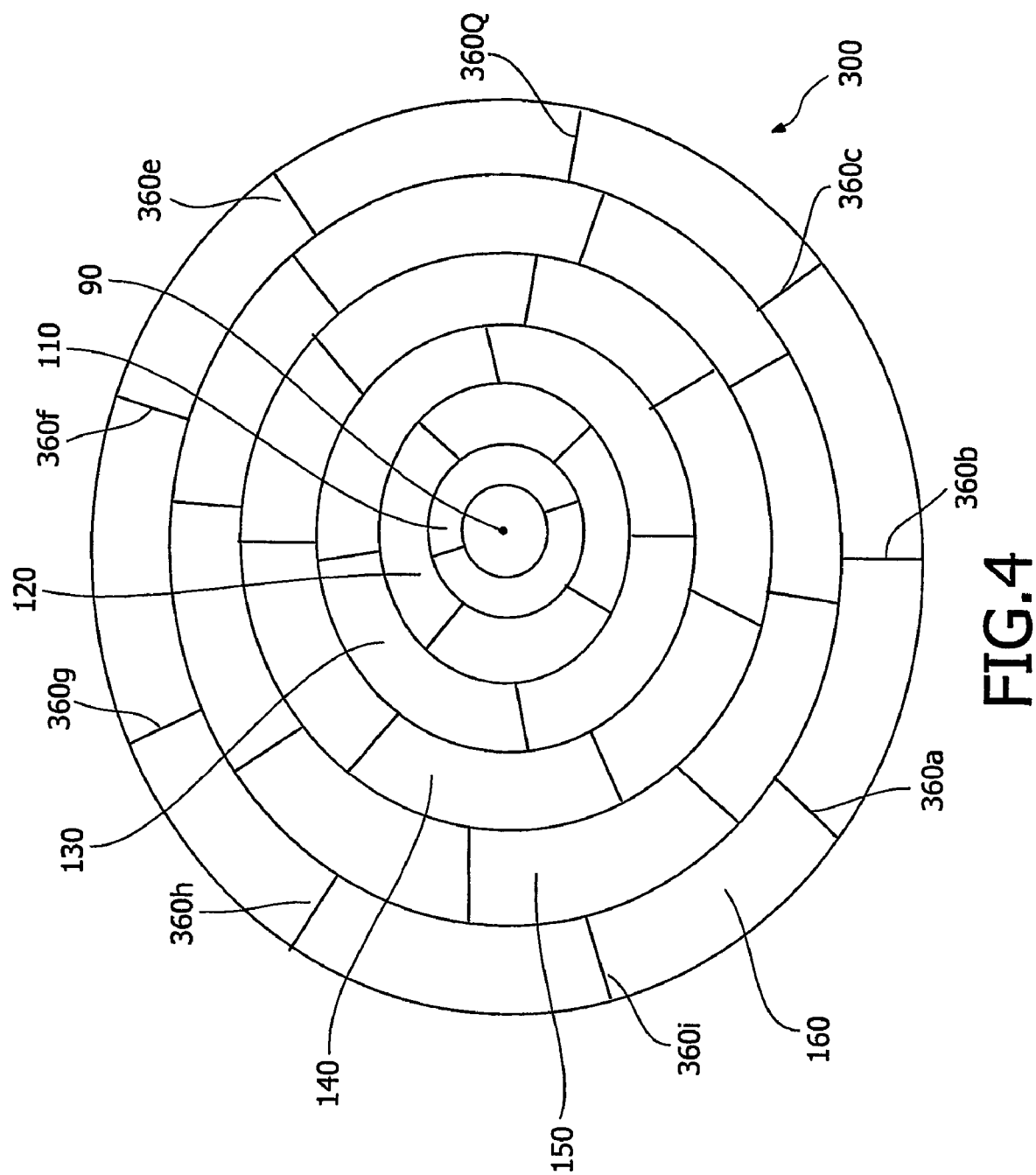

FIG. 4 shows a plan view of a further embodiment of the present invention; and

Figure 5A:
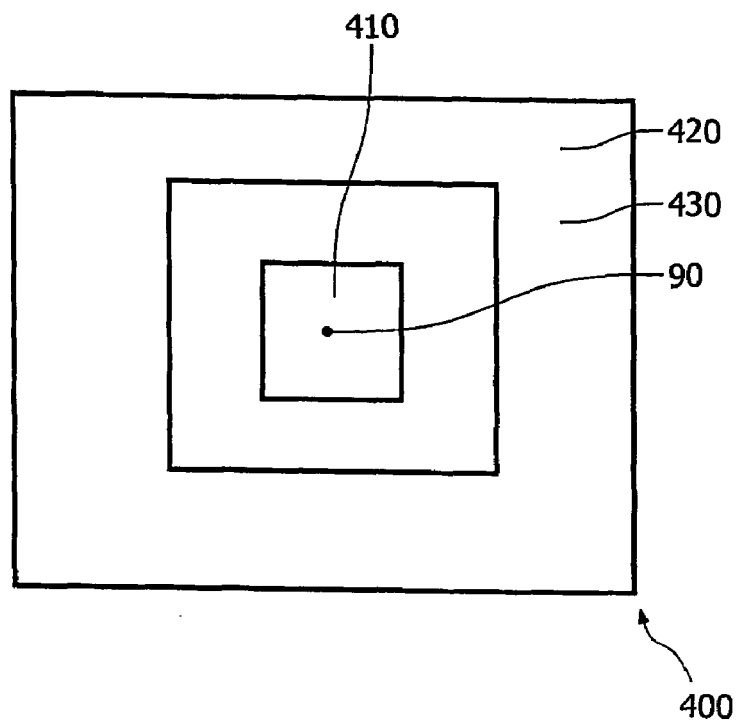
Figure 5B:
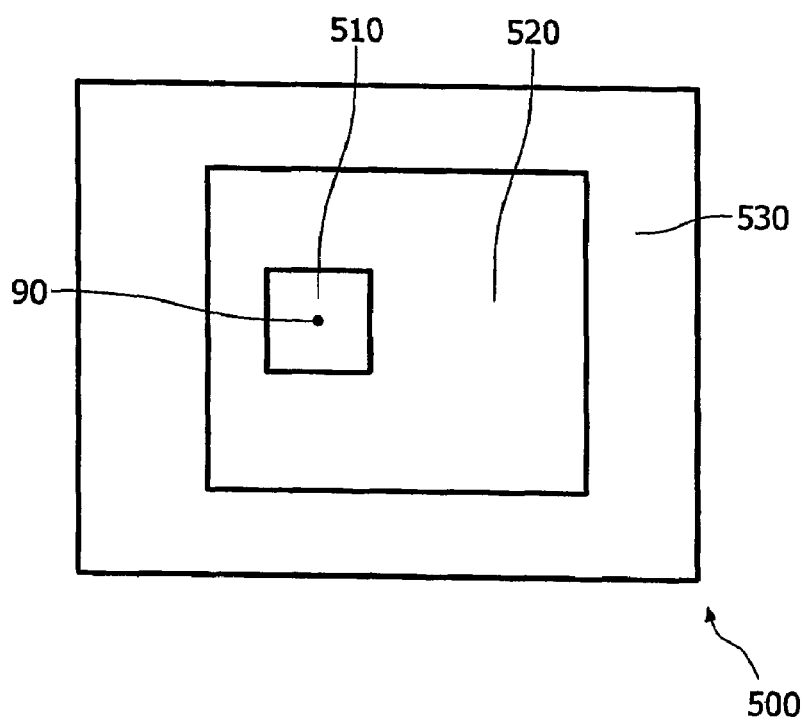

FIGS. 5A and 5B each show plan views of respective further embodiments of the present invention.

DETAILED DESCRIPTION OF PREFERRED EMBODIMENT

Figure 1:
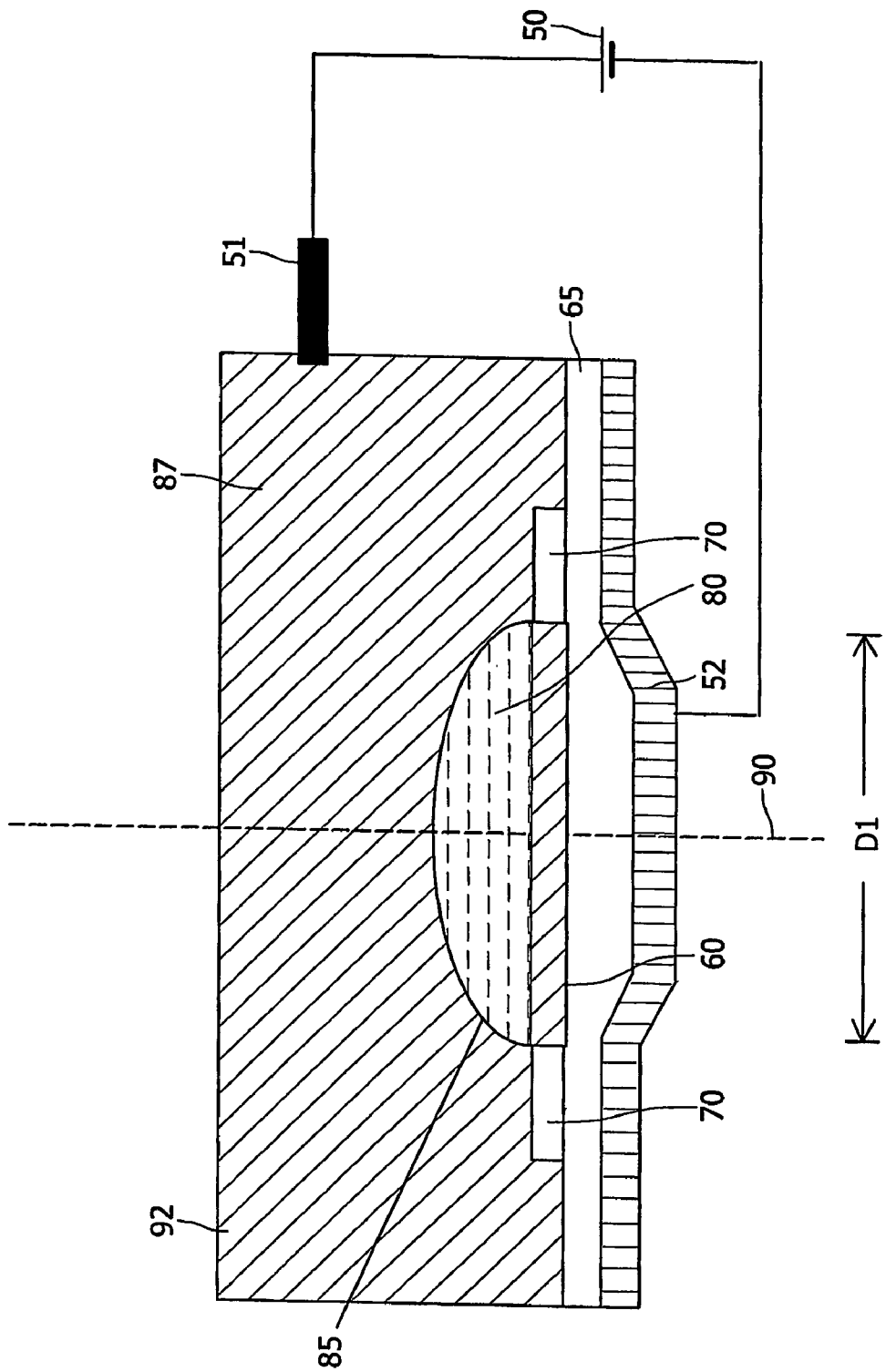
FIG. 1 illustrates a cross-sectional view of a known electrowetting variable lens.
Figure 2A:
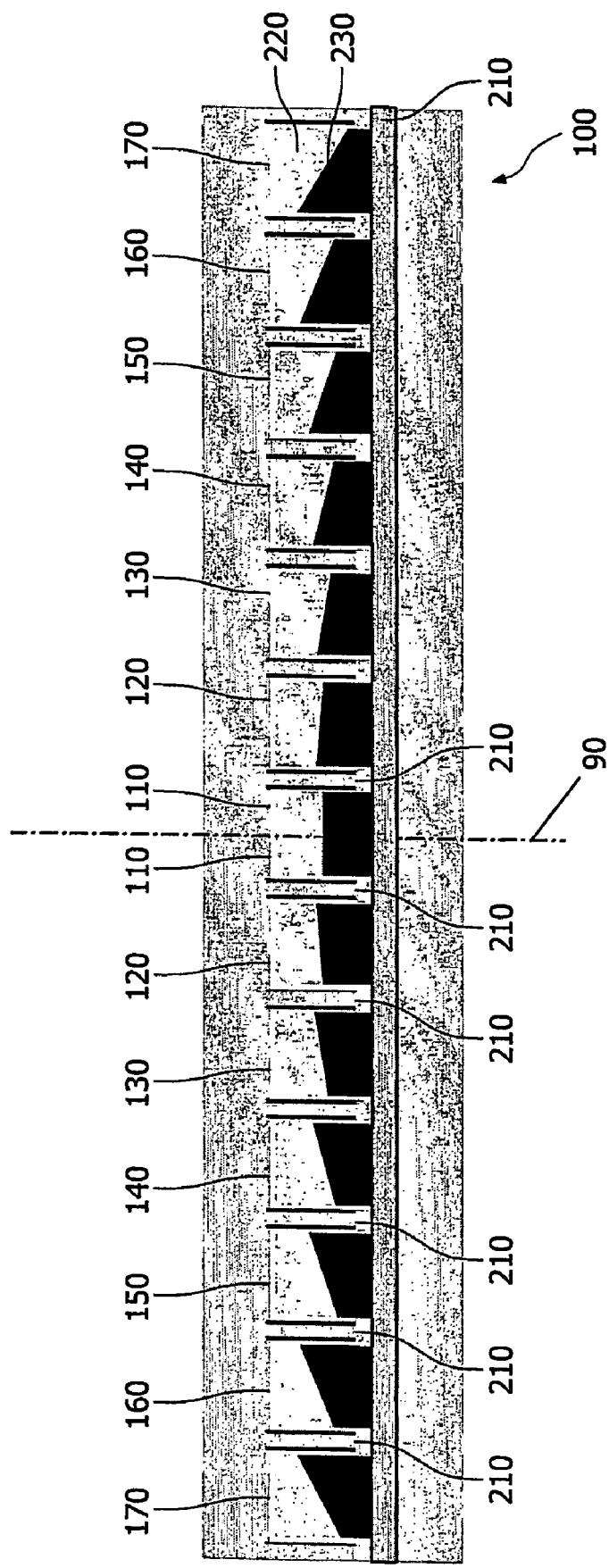
FIGS. 2A and 2B illustrate respectively a cross-sectional view and a plan view of a variable lens in accordance with a first embodiment of the present invention.
Figure 2B:
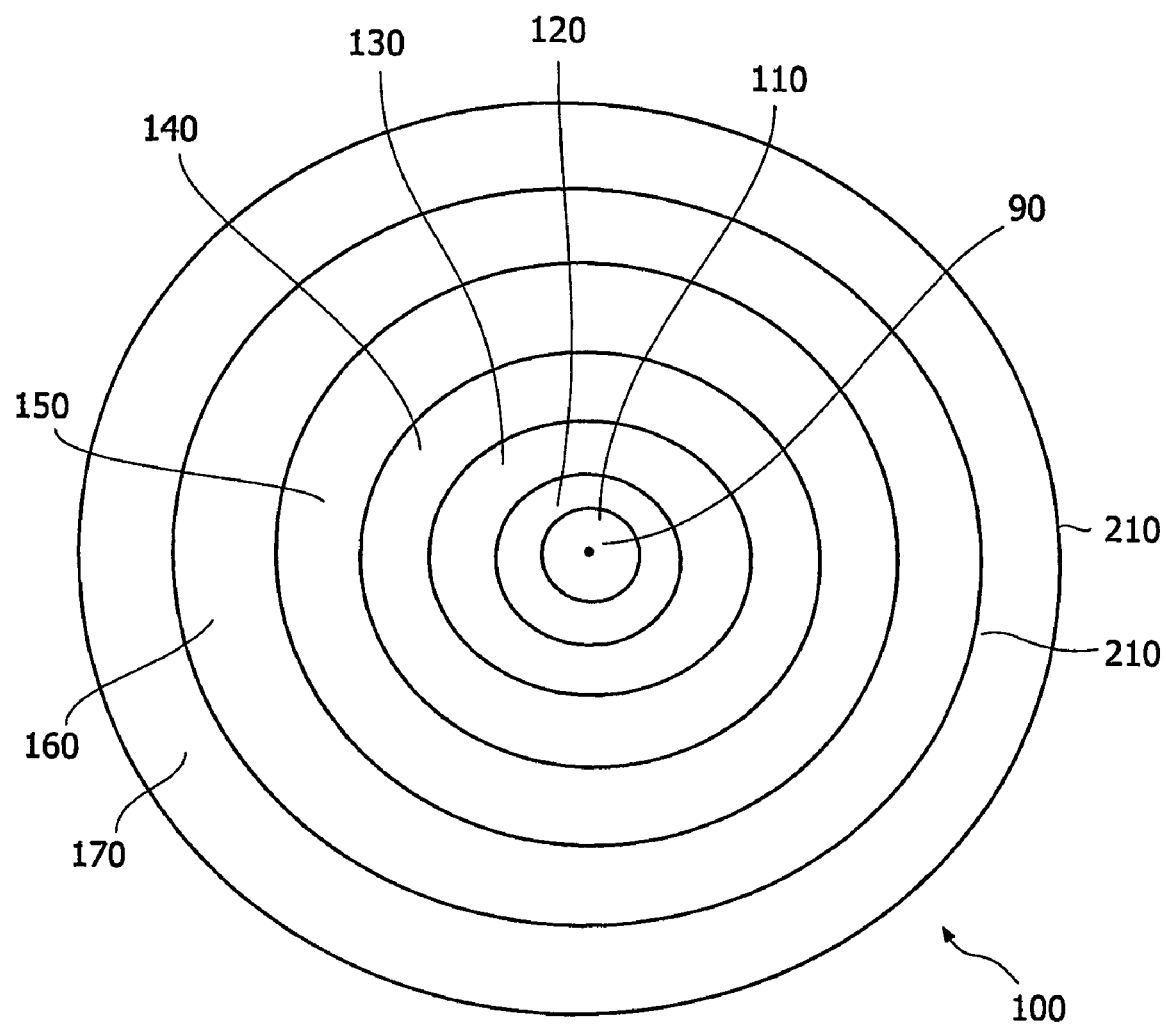

FIGS. 2A and 2B show respectively cross-sectional and plan views of a variable Fresnel lens 100 in accordance with a first embodiment of the present invention. An optical axis 90 extends through the centre of the lens 100.

The lens 100 comprises a series of annuli or rings (120, 130, 140, 150, 160, 170), surround a central electrowetting lens element 110.

Figure 3A:
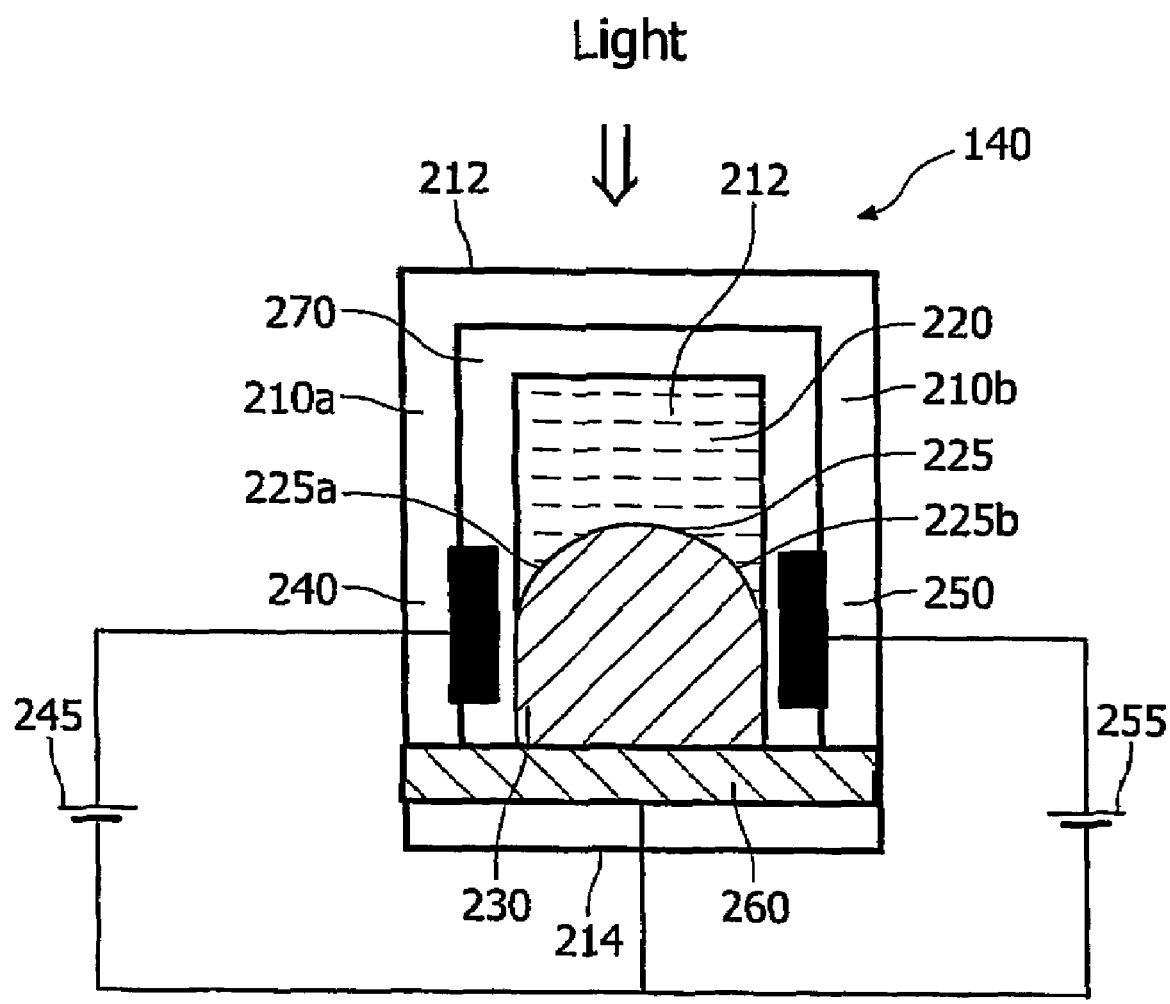
FIGS. 3A and 3B show respectively a schematic cross-sectional view of an annulus of the lens shown in FIGS. 2A and 2B, and an alternative configuration of the meniscus of the annulus cross-section shown in FIG. 3A.

FIG. 3A shows a cross-sectional view through one side of a ring e.g. ring 140. Each ring contains a first fluid 220 separated from a second fluid 230 by a meniscus 225. The meniscus 225 extends between side walls 210a, 210b. The meniscus 225 extends at least partially in a plane transverse the optical axis 90. The term transverse means the plane crosses (i.e. is not parallel to) the optical axis 90.

The fluids 220, 230 are substantially immiscible i.e. they can not be mixed. The fluids 220, 230 have different refractive indices, such that light incident upon the membrane 225 will be refracted.

The two fluids 220, 230 are preferably arranged to have an equal density, so as to minimise the gravitational effects between the two fluids such that the lens will function independently of orientation.

A fluid is a substance that alters its shape in response to any force, that tends to flow or to conform to the outline of its chamber, and that includes gases, liquids, vapours and mixtures of solids and liquids capable of flow.

In this particular embodiment, the first fluid 220 is a non-conducting non-polar liquid, such as a silicone oil or an alkane. The second fluid 230 is a conducting or polar liquid such as water containing a salt solution (or a mixture of water and ethylene glycol).

The varying shape of the interface 225 will vary the refractive properties provided by the interface. The shape of the interface 225 is adjusted by the electrowetting phenomenon, by applying voltage between the electrode 260 and the electrode 240, and a voltage between the electrode 260 and the electrode 250. Although in FIG. 3A, the voltage sources 245, 255 are indicated as DC sources, it will be appreciated that in fact any voltage source can be used as desired. Preferably, such a voltage source is arranged to be continuously variable between a range of voltages, so as to allow the contact angle the meniscus makes with each side wall to be continuously varied.

So as to allow the transmission of the light through the lens 100, at least opposite faces of the rings (in the orientation shown in FIGS. 2A and 3A, the top and bottom surfaces) are transparent. In this particular embodiment, each ring has a rectangular cross-section 210, with light entering and exiting through the transparent ends 212, 214. The fluids 220, 230 are enclosed within the sealed space defined by the transparent ends 212, 214 and the side walls 210a, 210b. One end (the end shown as electrode 260) of the interior surface of the ring 140 is hydrophilic so as to attract the polar fluid 230. The remainder of the ring 140 (i.e. the opposite end, and the interior side walls) is coated with a hydrophobic coating 270.

The surface of electrode 260 in contact with fluid 230 may be formed entirely of a hydrophilic material, or alternatively coated with a hydrophilic layer (e.g. silicon dioxide or glass). The electrode 260 may be covered with a thin insulating layer, such that the electrode is capacitively coupled to the fluid 230.

In this particular embodiment, the hydrophilic area 260 of the interior surface is completely covered by a transparent hydrophilic conductor (e.g. Indium Tin Oxide), so as to form an electrode in conductive contact with fluid 230. In this particular embodiment, the electrode 260 extends across each of the rings, so as to provide a common electrode for each ring.

The construction of each ring 120–170 is similar to the ring 140 shown in FIG. 3A.

The shape of the interface 225 within each ring is varied by application of the electrowetting effect.

Figure 3B:
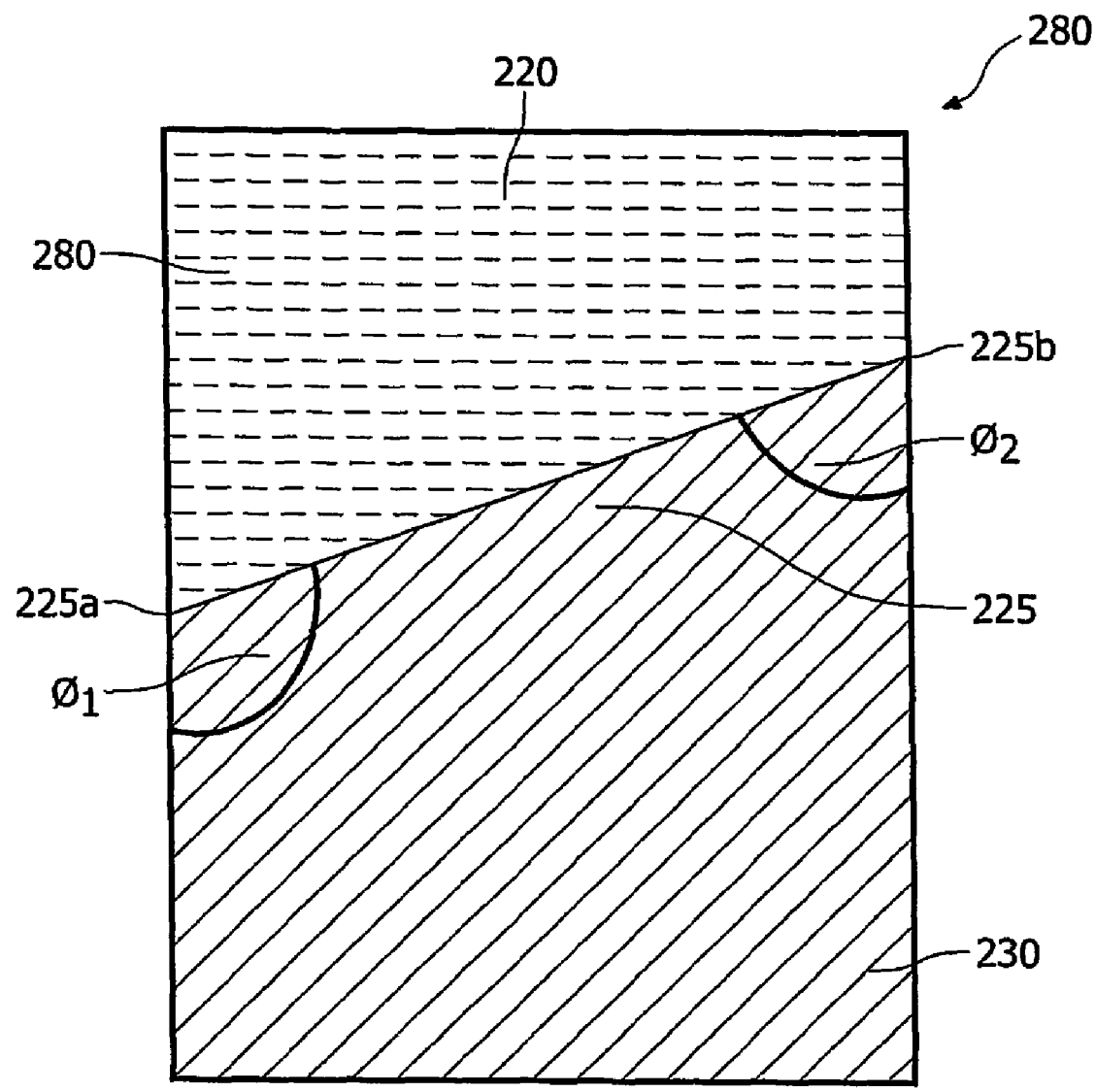

FIG. 3B illustrates the chamber 280 of FIG. 3A, with the contact angles ($\varnothing_1$, $\varnothing_2$) of each side 225a, 225b of the meniscus 225 having been varied from the configuration shown in FIG. 3A, by applying voltages from voltage sources 245, 255. If the sum of the contact angles $\varnothing_1 + \varnothing_2 = 180°$, then the meniscus shape will be substantially flat. However, in most configurations, this condition is not satisfied, such that the meniscus shape will be curved. Indeed, for the spherical Fresnel lens shape shown, it is preferable that the shape of the meniscus in each compartment is curved (e.g. it has a spherical cross-section). In most instances, the meniscus will be tilted i.e. one side of the perimeter of the meniscus will be higher than the opposite side. In such circumstances, the meniscus extending across the central chamber 110 will typically be spherical. The curvatures of these menisci are, generally, relatively small.

By applying a voltage from a voltage source across the polar liquid 230 by the transparent electrode 260 and one of the annular electrodes 240, 250 extending around the lens 100 in proximity to one of the two three-phase lines (225a, 225b) of the meniscus, the respective contact angle of the three-phase line can be controllably changed. The electrodes 240, 250 are not in conductive contact with the polar fluid 230.

By arranging for one area of the interior surface of the ring to be hydrophilic, with the remainder of the interior surface being hydrophobic, then it will be appreciated that in this two fluid system the stability of the device will be greatly enhanced. The polar fluid will not adhere to any portion of the interior surface where it is desired to have only the non-polar fluid, and vice versa.

It should be noted that this condition does not prohibit the polar fluid 230 being in contact with part of the hydrophobic coating 270. The purpose of the hydrophilic layer is to locate the polar fluid i.e. to keep the polar fluid in a desired position (with the position often defining at least in part the shape). Thus, a relatively small hydrophilic area may be suitable for this purpose. For instance, the whole of the interior surface of a ring could be hydrophobic, apart from those areas in which it is necessary to keep the polar fluid(s) in a certain shape or position.

Electrowetting can be used to increase the wettability of a polar or conducting fluid on a surface. If this wettability is initially small (for a polar liquid this is usually termed a hydrophobic surface, e.g. a Teflon-like surface), a voltage can be used to make it larger. If the wettability is initially large (for a polar liquid this is usually called a hydrophilic surface, e.g. silicon dioxide) then applying voltage will have relatively little effect. It is therefore preferable that in electrowetting devices the three-phase line is initially in contact with a hydrophobic layer.

The central chamber of the lens 100 (i.e. the lens element 110) is an electrowetting device of similar construction to that shown by the ring cross-section 140 in FIG. 3A. Typically, the central chamber 110 will be cylindrical, with an annular electrode extending around the outside of the surface (i.e. electrodes 240, 250 shown in FIG. 3A will be a common electrode).

By appropriately varying the contact angles of the menisci within each of the rings of the lens 100, the focal distance of the Fresnel lens can be controllably adjusted. Furthermore, such a configuration may be used to make a variable aspheric lens.

It will be appreciated that the above embodiments are described by way of example only, and that various alternatives will be apparent to the skilled person.

For instance, although in the above embodiment it has been assumed that the same two fluids are utilized within each ring, it will be appreciated that in fact each ring can contain two different fluids. By using different fluids (and/or different surface materials of the compartment having different electrowetting properties), it is possible to tune the initial contact angle of the menisci such that a proper lens function is achieved by applying the same voltage across the electrode in each ring. In such an instance, it can be preferable to arrange for each of the electrodes in each annulus to be connected to the corresponding respective electrodes within the other annuli. This interconnection of electrodes can simplify fabrication of the lens.

The walls 210 separating each of the rings are preferably as thin as possible to avoid deterioration of the optical quality of the lens 100, however, it will be appreciated that such walls can be of any desired thickness.

Although each ring has been described as a continuous chamber, it will be appreciated that in fact the ring can be formed of a number of compartments. Electrodes may be placed on the dividing walls between the compartment. Such electrodes can be separate to, or connected to the electrodes within the side walls of the lens. Such additional electrodes can improve the tunability of the lens, and facilitate obtaining the preferred 90° initial contact angle.

For instance, FIG. 4 shows a Fresnel lens 300 of generally similar construction to that shown in FIGS. 2A–3B, with identical reference numerals denoting similar features. However, in this particular embodiment, it will be noted that each ring is divided into a number of separate compartments by dividing walls e.g. ring 160 is divided into a number of compartments by dividing walls 360*a*–360*i*. This compartmentalisation minimises the effects of movements and vibrations upon the meniscus. Further, if the density of the two fluids within each compartment differs (e.g. the first and the second fluid are of different densities), then the compartments act to minimise the effect of gravity upon the lens.

The lens can further comprise a voltage control unit, arranged to control the voltages applied to the electrodes within the lens, so as to achieve the desired lens configuration. The voltage control system may be arranged to simply apply voltages in a predetermined manner to achieve any desired lens shape, based upon a calibration of the lens response for any given voltage. Alternatively, a feedback system can be used, such as a capacitive read-out system, to measure the position of the meniscus and/or contact angle of the meniscus.

To allow the lens to compensate for ambient temperature changes, each of the compartments within the rings can be connected to a flexible reservoir.

In the above embodiments, the lens has been described as being formed of a series of concentric circular rings, having a common central axis corresponding to the optical axis 90. However, it will be appreciated that the rings need not be circular, but can be of any desired shape e.g. square, rectangular or elliptical. Such rings can again be divided into compartments, as described previously.

FIG. 5A illustrates a lens 400 comprising a series of rectangular rings 410, 420, 430.

Equally, it will be appreciated that the rings do not have to be concentric, but may be eccentric. For instance, FIG. 5B illustrates a lens 500 comprising a series of rings 510, 520, 530 that do not share a common centre, although each of the rings extends around the optical axis 90.

Although the lens arrangement has been described in relation to a particular type of electrowetting lens configuration, it will be appreciated that in fact any electrowetting lens configuration can be used to provide a lens comprising a series of rings as described herein. For instance, each ring could correspond to the lens arrangement described in WO 99/18456.

Such variable lenses may be used in a variety of applications, including overhead projectors, infrared imaging and solar cell technology. Both the tunability of the focal length of the lens, as well as the modification of the interface between the two fluids to produce an arbitrary asphericity, provides many options for applications of the lens.

For instance, the Fresnel lenses currently used in solar cell technology have a fixed focus and shape. A Fresnel lens in accordance with an embodiment of the present invention could be used to make an adaptive system that changes configuration with the apparent movement of the sun in relation to the position in which the solar cell is fixed to the earth, thus enhancing the efficiency of the solar cell system.

Alternatively, such a Fresnel lens could be used to create a depth impression on a display unit, such as a VDU (Visual Display Unit). A Fresnel lens could be placed at a distance, somewhat less than the focal distance, in front of a display. This acts to produce a substantially collimated display yielding a depth impression. This can be used to make, for instance, PC games including flight and car simulations more realistic. If an electrowetting lens is utilized, the lens can be switched off, such that the display can also be used in the normal mode.

By providing a lens as described above, a lens arrangement is produced that allows a relatively large lens to be produced whilst still maintaining a relatively fast response time. Further, the lens is thin compared to a lens of a similar diameter produced from a single meniscus.

The invention claimed is:

1. A variable lens (100; 300; 400; 500) having an optical axis (90), the lens comprising a plurality of annuli (120, 130, 140, 150, 160, 170; 420, 430; 520, 530) located around the optical axis, each annulus having respective side walls (210*a*, 210*b*) defining a chamber (280) containing a first fluid (220) and a second fluid (230) in contact over a meniscus (225), the fluids (220, 230) being substantially immiscible and having different refractive indices; and wherein at least one of the annuli (140) comprises at least one electrode (240) for altering the configuration of the meniscus (225).

2. A lens as claimed in claim 1, wherein the meniscus (225) within each annulus extends between a respective side wall (210*a*) adjacent the optical axis (90) and a respective side wall (210*b*) distant from the optical axis.

3. A lens as claimed in claim 2, wherein the configuration of the meniscus (225) is altered by changing the contact angle ($\varnothing_1$, $\varnothing_2$) of the meniscus on at least one of the side walls.

4. A lens as claimed in claim 2, wherein the contact angle ($\varnothing_1$) the meniscus (225) makes with the adjacent side wall (210a) and the contact angle ($\varnothing_2$) the meniscus makes with the distant side wall (210b) are both independently controllable.

5. A lens as claimed in claim 1, wherein the annuli (120, 130, 140, 150, 160, 170; 420, 430; 520, 530) are at least one of circular, elliptical, rectangular and square.

6. A lens as claimed in claim 1, wherein the annuli (120, 130, 140, 150, 160, 170; 420, 430; 520, 530) are concentric.

7. A lens as claimed in claim 6, wherein the optical axis (90) extends through a common centre of the annuli (120, 130, 140, 150, 160, 170; 420, 430; 520, 530).

8. A lens as claimed in claim 1, wherein the first fluid (220) and the second fluid (230) have substantially the same density.

9. A lens as claimed in claim 1, further comprising a flexible fluid reservoir connected to at least one of said chambers (280).

10. A lens as claimed in claim 1, wherein at least two of the annuli (120, 130, 140, 150, 160, 170; 420, 430; 520, 530) each comprise a respective electrode (240), the respective electrodes (240) being electrically connected.

11. A lens as claimed in claim 1, wherein at least one of said annuli (120, 130, 140, 150, 160, 170; 420, 430; 520, 530) is compartmentalised by at least one dividing wall comprising at least one electrode.

12. A device comprising a variable lens (100; 300; 400; 50), the variable lens having an optical axis (90), the lens comprising a plurality of annuli (120, 130, 140, 150, 160, 170; 420, 430; 520, 530) located around the optical axis, each annulus having respective side walls (210a, 210b) defining a chamber (280) containing a first fluid (220) and a second fluid (230) in contact over a meniscus (225), the fluids (220, 230) being substantially immiscible and having different refractive indices; and wherein at least one of the annuli (140) comprises at least one electrode (240) for altering the configuration of the meniscus (225).

13. A device as claimed in claim 12, further comprising a voltage control system for applying a voltage to said electrode (240) so as to achieve a desired meniscus configuration.

14. A device as claimed in claim 12, wherein the voltage is determined by measuring a capacitance within the lens.

15. A device as claimed in claim 12, wherein the device comprises at least one of: a solar cell; a cover for an optical display unit; an optical display unit; a light projector; and an infrared imaging device.

16. A method of manufacturing a variable lens (100; 300; 400; 500) having an optical axis (90), the method comprising:
providing a plurality of annuli (120, 130, 140, 150, 160, 170; 420, 430; 520, 530) located around the optical axis (90), each annulus having respective side walls (210a, 210b) defining a chamber (280);
filling the chamber (280) with a first fluid (220) and a second fluid (230) in contact over a meniscus (225), the fluids (220, 230) being substantially immiscible and having different refractive indices; and
providing at least one of the annuli (140) with at least one electrode (240) for altering the configuration of the meniscus (225).

17. A method of manufacturing a device comprising a variable lens (100; 300; 400; 500), the method comprising:
providing a plurality of annuli (120, 130, 140, 150, 160, 170; 420, 430; 520, 530) located around the optical axis (90), each annulus having respective side walls (210a, 210b) defining a chamber (280) containing a first fluid (220) and a second fluid (230) in contact over a meniscus, the fluids being substantially immiscible and having different refractive indices; and
wherein at least one of the annuli (140) comprises at least one electrode (240) for altering the configuration of the meniscus (225).

* * * * *